(12) United States Patent
Park et al.

(10) Patent No.: US 11,710,817 B2
(45) Date of Patent: Jul. 25, 2023

(54) METHOD FOR DESIGNING ELECTRODE FOR LITHIUM SECONDARY BATTERY AND METHOD FOR MANUFACTURING ELECTRODE FOR LITHIUM SECONDARY BATTERY COMPRISING THE SAME

(71) Applicant: LG Chem, Ltd., Seoul (KR)

(72) Inventors: Ji Hye Park, Daejeon (KR); Song Taek Oh, Daejeon (KR); Jeong Gil Kim, Daejeon (KR)

(73) Assignee: LG Energy Solution, Ltd.

( * ) Notice: Subject to any disclaimer, the term of this patent is extended or adjusted under 35 U.S.C. 154(b) by 791 days.

(21) Appl. No.: 16/633,820

(22) PCT Filed: Sep. 18, 2018

(86) PCT No.: PCT/KR2018/011008
§ 371 (c)(1),
(2) Date: Jan. 24, 2020

(87) PCT Pub. No.: WO2019/059619
PCT Pub. Date: Mar. 28, 2019

(65) Prior Publication Data
US 2021/0036307 A1 Feb. 4, 2021

(30) Foreign Application Priority Data

Sep. 19, 2017 (KR) .................. 10-2017-0120604

(51) Int. Cl.
*H01M 4/139* (2010.01)
*H01M 4/62* (2006.01)
(Continued)

(52) U.S. Cl.
CPC ......... *H01M 4/139* (2013.01); *H01M 4/1391* (2013.01); *H01M 4/624* (2013.01);
(Continued)

(58) Field of Classification Search
None
See application file for complete search history.

(56) References Cited

U.S. PATENT DOCUMENTS

2007/0020525 A1 1/2007 Kim et al.
2013/0209893 A1 8/2013 Archer et al.
(Continued)

FOREIGN PATENT DOCUMENTS

CN 104718649 A 6/2015
CN 104931796 A 9/2015
(Continued)

OTHER PUBLICATIONS

Extended European Search Report including Written Opinion for EP18859308.1 dated Oct. 5, 2020; 8 pages.
(Continued)

*Primary Examiner* — Robert S Carrico
(74) *Attorney, Agent, or Firm* — Lerner David LLP (57) ABSTRACT

Provided are a method for designing an electrode for a lithium secondary battery comprising measuring the electrical conductivity of an electrode with an alternating current to determine whether an electrical path in the electrode has been appropriately formed, and a method for manufacturing an electrode for a lithium secondary battery comprising the same. According to the present invention, it is possible to determine the content of a conductive agent in the electrode using the same.

6 Claims, 5 Drawing Sheets

(51) Int. Cl.
*H01M 10/42* (2006.01)
*H01M 4/1391* (2010.01)
*H01M 10/052* (2010.01)
*H01M 10/48* (2006.01)
*H01M 4/02* (2006.01)

(52) U.S. Cl.
CPC ..... *H01M 10/052* (2013.01); *H01M 10/4285* (2013.01); *H01M 10/48* (2013.01); *H01M 2004/028* (2013.01)

(56) References Cited

U.S. PATENT DOCUMENTS

| 2015/0311533 A1 | 10/2015 | Tachibana et al. |
| 2017/0338468 A1 | 11/2017 | Kim et al. |
| 2019/0221850 A1 | 7/2019 | Tachibana et al. |

FOREIGN PATENT DOCUMENTS

| JP | 2007103065 A | 4/2007 |
| JP | 2013096725 A | 5/2013 |
| JP | 2013110082 A | 6/2013 |
| JP | 5484016 B2 | 5/2014 |
| JP | 2015222651 A | 12/2015 |
| KR | 100686816 B1 | 2/2007 |
| KR | 101486429 B1 | 1/2015 |
| KR | 20150083831 A | 7/2015 |
| KR | 20160087353 A | 7/2016 |
| WO | 2014042266 A1 | 3/2014 |
| WO | 2016036091 A1 | 3/2016 |

OTHER PUBLICATIONS

Badot JC, Lestriez B, Dubrunfaut O. Interest in broadband dielecliic spectroscopy to study the electronic transport in materials for lithium batteries. Materials Science and Engineering: B. Nov. 1, 2016;213:190-198.

Mac Kim et al., Dielectric Relaxation in $Li_2O$—$0.5B_2O_3$—$0.5SiO_2$ Glass: Electrical Conductivity, Impedance and Modulus Analyses, New Physics: Sae Mulli, vol. 67, No. 1, Jan. 2017, pp. 17-23.

International Search Report for PCT/KR2018/011008 dated Mar. 12, 2019.

Search Report dated Jul. 13, 2022 from the Office Action for Chinese Application No. 201880048280.X. dated Jul. 20, 2022, pp. 1-2.

Sun, L. et al., "Dependence of Dielectric Properties and Percolative Behavior on Phase Separation Structure Induced by Heterogeneous Carbon Nanofiber Distribution in Polymer Blend Nanocomposites," Macromolecular Materials and Engineering, Nov. 2011, pp. 992-1001, vol. 296, Wiley.

METHOD FOR DESIGNING ELECTRODE FOR LITHIUM SECONDARY BATTERY AND METHOD FOR MANUFACTURING ELECTRODE FOR LITHIUM SECONDARY BATTERY COMPRISING THE SAME

CROSS-REFERENCE TO RELATED APPLICATIONS

This application is a national phase entry under 35 U.S.C. § 371 of International Application No. PCT/KR2018/011008, filed Sep. 18, 2018, which claims priority to Korean Patent Application No. 10-2017-0120604, filed Sep. 19, 2017, in the Korean Intellectual Property Office, the disclosure of which is incorporated herein by reference.

TECHNICAL FIELD

The present invention relates to a method for designing an electrode for a lithium secondary battery and a method for manufacturing an electrode for a lithium secondary battery comprising the same, and more specifically, to a method for designing an electrode for a lithium secondary battery comprising measuring the electrical conductivity of an electrode with an alternating current to determine whether an electrical path in the electrode has been appropriately formed, and a method for manufacturing an electrode for a lithium secondary battery comprising the same.

BACKGROUND ART

As technology development and demand for mobile devices have increased, the demand for secondary batteries as an energy source has been rapidly increased. Among such secondary batteries, lithium secondary batteries having high energy density and operating potential, long cycle life, and low self-discharging rate have been commercialized and widely used.

In recent years, due to the growing interest in environmental issues, there have been many studies conducted on electric vehicles (EV) and hybrid electric vehicles (HEV) which can replace vehicles that use fossil fuels, such as gasoline vehicles and diesel vehicles, which are one of the main causes of air pollution. As a power source of such electric vehicles (EV) and hybrid electric vehicles (HEV), nickel-hydrogen metal (NI-MH) secondary batterers are mainly is used. However, research has been actively conducted on lithium secondary batteries of high energy density, high discharge voltage, and output stability, some of which are commercially available.

In general, a lithium secondary battery has a structure in which an electrode assembly is impregnated with a lithium electrolyte, the assembly comprising a positive electrode containing a lithium transition metal oxide as an electrode active material, a negative electrode containing a carbon-based active material, and a separator. Such a lithium secondary battery has a non-aqueous composition. An electrode is generally manufactured by coating an electrode slurry on a metal foil, and the electrode slurry is prepared by mixing an electrode mixture in a solvent such as N-methyl pyrrolidone, the electrode mixture being composed of an electrode active material for storing energy, a conductive agent for imparting electrical conductivity, and a binder for bonding the electrode active material and the conductive agent to an electrode foil and providing a bonding force therebetween. Here, as a positive electrode active material, a lithium cobalt-based oxide, a lithium manganese oxide, a lithium nickel-based oxide, a lithium complex oxide, and the like area mainly used, and as a negative electrode active material, a carbon-based material is mainly used.

In general, a conductive agent is added to a positive electrode mixture and a negative electrode mixture to improve the electrical conductivity of an active material. In particular, since a lithium transition metal oxide used as a positive electrode active material has low electrical conductivity, a conductive agent is essentially added to a positive electrode mixture.

The electric conductivity of an electrode varies depending on the content of a conductive agent and a binder contained in an electrode mixture of a lithium secondary battery. Also, depending on the type and shape of a conductive agent used, the output of a lithium secondary battery varies.

Accordingly, there is a need to variously adjust the content, type, and the like of an active material, a conductive agent, and a binder according to the properties of a lithium secondary battery to be manufactured, and in order to accurately evaluate the effect of the adjustment, a secondary battery cell should be directly manufactured to evaluate the output properties and the like. However, the manufacturing of a secondary battery cell has a problem in that consuming operations taking a lot of time and costs are accompanied.

Accordingly, there is a need for developing a method for designing an electrode for a lithium secondary battery which is capable of easily determining the optimum content of a conductive agent by identifying whether or not an electrical path is sufficiently formed in an electrode when compared to the manufacturing of a secondary battery cell, and a method for manufacturing an electrode for a lithium secondary battery using the same.

DISCLOSURE OF THE INVENTION

Technical Problem

An aspect of the present invention provides a method for designing an electrode for a lithium secondary battery capable of determining whether an electrical path in an electrode has been appropriately formed by measuring the electrical conductivity of the electrode with an alternating current, and a method for manufacturing an electrode for a lithium secondary battery comprising determining the composition of an electrode for a lithium secondary battery using same.

Technical Solution

According to an aspect of the present invention, there is provided a method for designing an electrode for a secondary battery comprising: (1) manufacturing a plurality of electrodes each comprising an active material, a binder, and a conductive agent, and having a different content of only the conductive agent each other; (2) using a broadband dielectric spectrometer (BDS) to apply an alternating current to each of the plurality of electrodes manufactured above while changing a frequency to measure the conductivity of each of the electrodes; (3) identifying a specific frequency (Fc) at a point at which the conductivity of each of the electrodes changes from a DC conductivity to an AC conductivity; and (4) comparing the identified specific frequency (Fc) and a preset reference frequency (Fr) to determine the content of the conductive agent contained in an electrode corresponding to a case in which the deviation between the reference frequency (Fr) and the specific frequency (Fc) is within a reference deviation, as an appropriate value.

In addition, according to another aspect of the present invention, there is provided a method for manufacturing an electrode for a lithium secondary battery comprising determining the composition of an electrode according to the designing method.

Advantageous Effects

A method for designing an electrode for a secondary battery according to the present invention comprises using a broadband dielectric spectrometer to observe the behavior of electrical conductivity of an electrode for a lithium secondary battery, establishing a method for determining whether an electric path is properly formed in the electrode by using data obtained through the same, and determining the content of a conductive agent included in the electrode by using the same. Therefore, it is possible to determine the composition of the electrode in a simple manner without a manufacturing process of a lithium secondary battery to confirm the performance of the electrode.

MODE FOR CARRYING OUT THE INVENTION

Hereinafter, the present invention will be described in more detail to facilitate understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A method for designing an electrode for a secondary battery according to the present invention comprises: (1) manufacturing a plurality of electrodes each comprising an active material, a binder, and a conductive agent, and having a different content of only the conductive agent each other; (2) using a broadband dielectric spectrometer (BDS) to apply an alternating current to each of the plurality of electrodes manufactured above while changing a frequency to measure the conductivity of each of the electrodes; (3) identifying a specific frequency (Fc) at a point at which the conductivity of each of the electrodes changes from a DC conductivity to an AC conductivity; and (4) comparing the identified specific frequency (Fc) and a preset reference frequency (Fr) to determine the content of the conductive agent contained in an electrode corresponding to a case in which the deviation between the reference frequency (Fr) and the specific frequency (Fc) is within a reference deviation, as an appropriate value.

The method for designing an electrode for a secondary battery of the present invention is to provide a way that can determine whether or not a conductive agent contained in an electrode for a lithium secondary battery has formed a sufficient electrical path in the electrode only by measuring the conductivity of the electrode using a broadband dielectric spectrometer (BDS) without manufacturing a battery containing the electrode to measure the resistance thereof.

The method for designing an electrode for a secondary battery according to the present invention first comprises (1) manufacturing a plurality of electrodes each comprising an active material, a binder, and a conductive agent, and having a different content of only the conductive agent each other.

In step (1), in order to determine an appropriate content of the conductive agent contained in an electrode, a process of manufacturing electrodes having different contents of the conductive agent may be performed, the electrodes for example having the same type of active material and binder but different contents of conductive agent in an entire electrode slurry.

The electrodes each in step (1) may comprise an additional conductive material other than the conductive agent, and when the electrodes each comprise an additional conductive material other than the conductive agent, the conductivity of the electrode, that is, the electrical connection state may be changed due to the conductive material. At this time, the plurality of electrodes in step (1) may be manufactured by varying the content of the conductive agent and the conductive material.

The electrode may be manufactured by a typical manufacturing method of an electrode. For example, the electrode may be manufactured through steps of preparing an active material slurry containing an active material, a binder, and a conductive agent, applying the prepared active material slurry on a metal foil, and then drying and roll pressing the same.

In step (2), using a broadband dielectric spectrometer (BDS), the conductivity of each of the electrodes is measured by applying an alternating current to each of the plurality of electrodes manufactured above while changing a frequency.

In step (2), the conductivity is measured by applying an alternating current to an electrode using a broadband dielectric spectrometer. The measuring of the conductivity of an electrode in step (2) comprises a step of observing the change in conductivity of the electrode according to the change in alternating current. Specifically, by measuring the conductivity of an electrode while increasing the frequency of the alternating current by a certain interval, the electrical conductivity value of the electrode corresponding to the frequency of the alternating current is obtained.

In step (3), a specific frequency (Fc) at a point at which the conductivity of the electrodes changes from a DC conductivity to an AC conductivity is identified.

When the conductivity of the electrode is measured by applying an alternating current while increasing the frequency thereof by a certain interval using the broadband dielectric spectrometer, the measured conductivity is changed from a DC conductivity to an AC conductivity after a certain frequency value.

Figure 1:
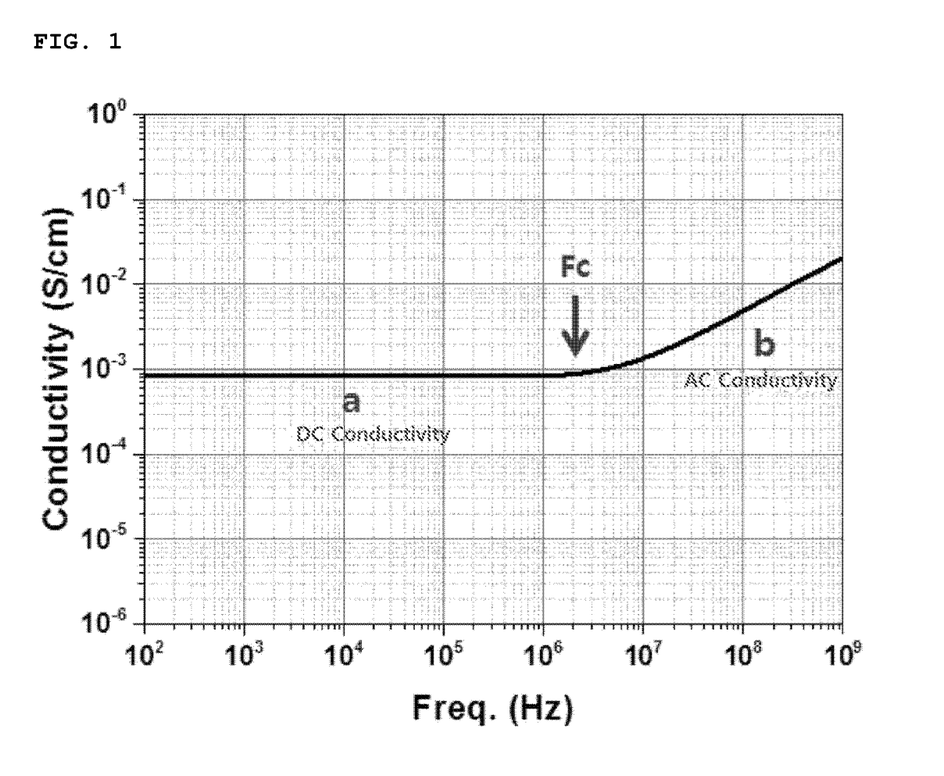
FIG. 1 is a graph for illustrating a state in which the electrical conductivity of an electrode changes from a DC conductivity to an AC conductivity in accordance with a frequency.

As shown in FIG. 1, by measuring the conductivity of the electrode according to the change in frequency, a frequency at a point at which the DC conductivity is changed to the AC conductivity may be identified, and in the method for designing an electrode for a lithium secondary battery, the frequency of alternating current at the point at which the conductivity of the electrode is changed from the DC conductivity to the AC conductivity is defined as a specific frequency (Fc).

In step (4), by comparing the identified specific frequency (Fc) and a preset reference frequency (Fr), a step of determining the content of a conductive agent contained in the electrode corresponding to a case in which the deviation between the reference frequency (Fr) and the specific frequency (Fc) is within a reference deviation as an appropriate value may be performed.

When there are a plurality of electrodes corresponding to the case in which the deviation between the reference frequency (Fr) and the specific frequency (Fc) is within a reference deviation, it is possible to determine the content of the conductive agent contained in an electrode having a lower specific frequency (Fc) to be an optimum value.

The conductivity of an electrode for a secondary battery has a different value depending on the electrical connectivity in the electrode which is changed in accordance with the distribution of a conductive agent in the electrode. When the content of a conductive agent in an electrode is increased, the conductivity of the electrode is increased. However, mass transfer resistance is not further decreased after reaching a certain level. Accordingly, if the content of the conductive agent may be determined at the time when the mass transfer resistance is not further decreased but kept constant despite the increase in the content of the conductive agent, the content of the conductive agent at that point corresponds to an optimum content of the conductive agent contained in the electrode.

When the content of the conductive agent in the electrode is further increased, the conductivity of the electrode may be continuously increased and the specific frequency (Fc) of the point at which the conductivity of the electrode is changed from the DC conductivity to the AC conductivity may have an even higher value. However, unlike the increase in the conductivity of the electrode, the mass transfer resistance of the electrode is not further decreased when the content of the conductive agent exceeds a certain degree. Accordingly, when the conductive agent in excessively contained in the electrode, the specific frequency (Fc) value of the electrode may be increased, but unlike the increase in the specific frequency (Fc) value, the mass transfer resistance of the electrode is not changed. Therefore, the content of the conductive agent contained in the electrode having the specific frequency (Fc) corresponding to a point at which there is no change in the mass transfer resistance of the electrode may be evaluated as an appropriate content of the conductive agent.

After conducting experiments on various electrodes having different manufacturing conditions by using the method for designing an electrode for a lithium secondary battery, the inventors of the present invention have found that the specific frequency (Fc) corresponding to the point at which there is no change in the mass transfer resistance of the electrode, that is, the reference frequency (Fr) converges to a certain range regardless of the composition of the electrode.

The preset reference frequency (Fr) thus driven may be $5 \times 10^6$ Hz to $5 \times 10^7$ Hz, specifically $7 \times 10^6$ Hz to $3 \times 10^7$ Hz, more specifically $10^7$ Hz. After repeating a process for determining the reference frequency (Fr) of the method for designing an electrode for a lithium secondary battery according to an embodiment of the present invention, it has been confirmed that the value of the reference frequency (Fr) exhibits a value of $5 \times 10^6$ Hz or greater, and that when the frequency of the alternating current of the broadband dielectric spectrometer exceeds $5 \times 10^7$ Hz, there is no change in the mass transfer resistance of the electrode even when the composition, the manufacturing method, and the content of a conductive agent of the electrode vary.

In step (4), the reference deviation may be $3 \times 10^6$ Hz, specifically $2 \times 10^6$ Hz, more specifically $10^6$ Hz. For example, when the reference frequency (Fr) is $10^7$ Hz and the measured specific frequency (Fc) of the electrode is $10^4$ Hz, the deviation between the reference frequency (Fr) and the specific frequency (Fc) is as much as $9.99 \times 10^6$ Hz. Thus, it can be determined that the content of the conductive agent contained in the electrode is not appropriate. When the reference frequency (Fr) is $9 \times 10^6$ Hz, the deviation between the reference frequency (Fr) and the specific frequency (Fc) is $10^6$ Hz. Thus, according to the deviation criteria, the content of the conductive agent of the electrode may be determined to be appropriate. When a conductive agent or a conductive material other than the conductive agent forms an electrical path in an electrode more appropriately, the specific frequency (Fc) of the electrode becomes closer to the reference frequency (Fr). Accordingly, when the specific frequency (Fc) of the electrode identified in step (3) is very close to the reference frequency (Fr), the content of the conductive agent contained in the electrode at that time may be determined to be an optimum value.

The setting of the reference frequency (Fr) may be performed by a method comprising the following steps. The setting of the reference frequency (Fr) may be achieved by a method comprising: (i) manufacturing a plurality of electrodes having different compositions or manufacturing processes; (ii) using a broadband dielectric spectrometer (BDS) to apply an alternating current to each of the plurality of electrodes manufactured above while changing a frequency and measuring the conductivity of each of the electrodes; (iii) identifying a specific frequency (Fc) at a point at which the conductivity of each of the electrodes changes from a DC conductivity to an AC conductivity; (iv) manufacturing a plurality of lithium secondary batteries each comprising the respective electrodes, and identifying the value of mass transfer resistance (RM) in the specific frequency (Fc) of each of the lithium secondary batteries; and (V) observing the behavior of the value of mass transfer resistance (RM) according to the specific frequency (Fc) and setting the specific frequency (Fc) exhibiting the lowest value of mass transfer resistance (Rm) as the reference frequency (Fr).

In step (i) of the setting of the reference frequency (Fr), a plurality of electrodes having different compositions or manufacturing processes are manufactured.

The electrode manufactured through step (i) may be an electrode varying conditions such as the type of an active material, the type of a conductive agent, the content thereof, an active material for preparing an electrode slurry, the mixing conditions of the conductive agent and a binder, the addition conditions of an additive such as a dispersant for preparing the electrode slurry, the solid content of the electrode slurry. The reference frequency (Fr) having an appropriate value may be set as the electrodes of various kinds are obtained.

Steps (ii) and (iii) may be performed in the same manner as in steps (2) and (3) of the method for designing an electrode for a lithium secondary battery according to the present invention, and through steps (2) and (3), the specific frequency (Fc) value of each electrode manufactured in step (i) may be identified.

In step (iv), a plurality of lithium secondary batteries comprising each of the electrodes are manufactured, and then the value of mass transfer resistance (RM) in the specific frequency (Fc) of each of the lithium secondary batteries are identified.

The electrode may have different electrical connectivity thereinside depending on conditions such as the type of an active material, the type of a conductive agent, the content thereof, an active material for preparing an electrode slurry, the mixing conditions of the conductive agent and a binder, the addition conditions of an additive such as a dispersant for preparing the electrode slurry, the solid content of the electrode slurry, and the mass transfer resistance (Rm) of a lithium secondary battery comprising the electrode varies depending on the electrical connectivity of the electrode.

After step (iv), the specific frequency (Fc) value of each electrode manufactured in step (i), and the mass transfer resistance (Rm) value of a lithium secondary battery comprising the electrode may be identified.

In step (V), the behavior of the value of mass transfer resistance (RM) according to the specific frequency (Fc) is observed to set the specific frequency (Fc) exhibiting the lowest value of mass transfer resistance (Rm) as the reference frequency (Fr).

As described above, the conductivity of an electrode for a secondary battery has a different value depending on the electrical connectivity in the electrode which is changed in accordance with the distribution of a conductive agent in the electrode. When the content of a conductive agent in an electrode is increased, the conductivity of the electrode is increased. However, mass transfer resistance is not further decreased after reaching a certain level. That is, when the content of the conductive agent in the electrode is further increased, the conductivity of the electrode and the specific frequency (Fc) of the point at which the conductivity of the electrode is changed from the DC conductivity to the AC conductivity may have even higher values. However, unlike the increase in the conductivity of the electrode, the mass transfer resistance of the electrode is not further decreased when the content of the conductive agent exceeds a certain degree. Accordingly, when the specific frequency (Fc) value of each of the electrodes manufactured in step (i) and the mass transfer resistance (RM) value of a lithium secondary battery containing the corresponding electrode are shown in a graph, it can be seen that even when the specific frequency (Fc) value of the electrodes is increased, the mass transfer resistance (Rm) value of the lithium secondary battery is not further decreased below a certain value.

In the step (v), when there are a plurality of specific frequencies (Fc) exhibiting the lowest value of mass transfer resistance (Rm), the specific frequency (Fc) exhibiting the lowest frequency value may be set as the reference frequency (Fr). That is, the specific frequency (Fc) corresponding to the point at which there is no change in the mass transfer resistance since the mass transfer of the electrode is not further decreased below a certain value may be set as the reference frequency (Fr).

As described above, the inventors of the present invention have found that the specific frequency (Fc) corresponding to the point at which there is no change in the mass transfer resistance since the mass transfer of the electrode is not further decreased below a certain value, that is, the reference frequency (Fr) converges to a certain range regardless of the composition or the manufacturing process of the electrode. Accordingly, when electrodes are manufactured by varying the content of a conductive agent, or the contents of the conductive agent and a conductive material if the conductive material is additionally contained, and then the specific frequency (Fc) of each of the electrodes is measured. If values of the specific frequency (Fc) are close to the reference frequency (Fr), the electrical connectivity of the electrodes may be determined to be appropriately formed.

The method for designing an electrode for a lithium secondary battery of the prevent invention may be usefully used to determine the composition of an electrode to be manufactured. Therefore, the present invention provides a method for manufacturing an electrode for a lithium secondary battery comprising a process of determining the composition of the electrode according to the method for designing an electrode for a lithium secondary battery.

The electrode for a lithium secondary battery may be a positive electrode for a lithium secondary battery or a negative electrode for a lithium secondary battery, specifically, a positive electrode for a lithium secondary battery. The present invention provides an electrode for a lithium secondary battery manufactured according to the method for manufacturing an electrode for a lithium secondary battery, and a lithium secondary battery comprising the electrode for the lithium secondary battery.

In the present invention, the lithium secondary battery may comprise a positive electrode, a negative electrode, and a separator interposed between the positive electrode and the negative electrode.

The positive electrode may be manufactured by a typical method known in the art. For example, a positive electrode may be manufactured by mixing and stirring a positive electrode active material with a solvent, if necessary, a binder, a conductive agent, and a dispersant, to prepare a slurry, and applying (coating) the slurry on a current collector of a metal material followed by pressing and drying.

The current collector of a metal material is a metal having high conductivity, and is not particularly limited as long as it is a metal to which the slurry of the positive electrode active material can be easily bonded and which has high conductivity without causing a chemical change in the battery. For example, stainless steel, aluminum, nickel, titanium, fired carbon, or aluminum or stainless steel that is surface-treated with one of carbon, nickel, titanium, silver, and the like may be used. In addition, microscopic irregularities may be formed on the surface of the current collector to improve the adhesion of the positive electrode active material. The current collector may be used in various shapes such as that of a film, a sheet, a foil, a net, a porous body, a foam body, a non-woven fabric body, and the like, and may have a thickness of 3 μm to 500 μm.

The positive electrode active material may be, for example, a lithium cobalt oxide ($LiCoO_2$); a lithium nickel oxide ($LiNiO_2$); $Li[Ni_aCo_bMn_cM^1_d]O_2$ (wherein $M^1$ is one element selected from the group consisting of Al, Ga, and In, or two or more elements thereof, and $0.3 \leq a < 1.0$, $0 \leq b \leq 0.5$, $0 \leq c \leq 0.5$, $0 \leq d \leq 0.1$, and $a+b+c+d=1$); a layered compound such as Li $(Li_eM^2_{f-e-f}M^3_{f'})$ $O_{2-g}Ag$ (wherein $0 \leq e \leq 0.2$, $0.6 \leq f \leq 1$, $0 \leq f' \leq 0.2$, and $0 \leq g \leq 0.2$, and $M^2$ comprises one or more selected from the group consisting of Mn, Ni, Co, Fe, Cr, V, Cu, Zn, and Ti, $M^3$ is one or more selected from the group consisting of Al, Mg, and B, and A one or more selected from the group consisting of P, F, S, and N), or a compound substituted with one or more transition metals; a lithium manganese oxide such as $Li_{1+h}Mn_{2-h}O_4$ (wherein $0 \leq h \leq 0.33$), $LiMnO_3$, $LiMn_2O_3$, and $LiMnO_2$; a lithium copper oxide ($Li_2CuO_2$); a vanadium oxide such as $LiV_3O_8$, $V_2O_5$, and $Cu_2V_2O_7$; a Ni-site type lithium nickel oxide represented by Formula $LiNi_{1-i}M^4_iO_2$ (wherein $M^4$ is any one of Co, Mn, Al, Cu, Fe, Mg, B, or Ga and $0.01 \leq i \leq 0.3$); a lithium manganese complex oxide represented by Formula $LiMn_{2-j}M^5_jO_2$ (wherein $M^5$ is any one of Co, Ni, Fe, Cr, Zn, or Ta, and $0.01 \leq j \leq 0.1$) or Formula $Li_2Mn_3M^6O_8$ (wherein $M^6$ is any one of Fe, Co, Ni, Cu, or Zn); $LiMn_2O_4$ in which a part of Li in the formula is substituted with an alkaline earth metal ion; a disulfide compounds; $LiFe_3O_4$, $Fe_2(MoO_4)_3$, and the like, but is not limited thereto.

Examples of the solvent for forming the positive electrode may comprise organic solvents such as N-methyl pyrrolidone (NMP), dimethyl formamide (DMF), acetone, and dimethyl acetamide, or water, and these solvents may be used alone or in combination of two or more thereof. The amount of the solvent to be used is sufficient if the solvent may dissolve and disperse the positive electrode active material, the binder, and the conductive agent in consideration of an applying thickness of a slurry and preparing yield.

Specific examples of the binder may comprise a polyvinylidene fluoride-hexafluoropropylene copolymer (PVDF-co-HFP), polyvinylidenefluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, and poly acrylic acid, or a polymer having the hydrogen thereof substituted with Li, Na, or Ca, and the like, or various kinds of binder polymers such as various copolymers thereof.

The conductive agent is not particularly limited as long as it has conductivity without causing a chemical change in the battery. For example, graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; a conductive material such as a polyphenylene derivative, and the like may be used. The binder may be used in an amount of 1 wt % to 20 wt % based on the total weight of the positive electrode slurry.

The dispersant may be an aqueous dispersant or an organic dispersant agent such as N-methyl-2-pyrrolidone.

The negative electrode may be manufactured by a typical method known in the art. For example, the negative electrode may be manufactured by mixing and stirring the negative electrode active material with additives such as a binder and a conductive agent to prepare a negative electrode slurry, and applying (coating) the slurry on a negative electrode current collector followed by drying and pressing.

Examples of the solvent for forming the negative electrode may comprise organic solvents such as N-methyl pyrrolidone (NMP), dimethyl formamide (DMF), acetone, and dimethyl acetamide, or water, and these solvents may be used alone or in combination of two or more thereof. The amount of the solvent to be used is sufficient if the solvent may dissolve and disperse the negative electrode active material, the binder, and the conductive agent in consideration of an applying thickness of a slurry and preparing yield.

The binder may be used to bind negative electrode active material particles to hold a molded body, and is not particularly limited as long as it is a binder typically used in manufacturing a slurry for a negative electrode active material. For example, non-aqueous binders such as polyvinyl alcohol, carboxymethyl cellulose, hydroxypropylene cellulose, diacetylene cellulose, polyvinyl chloride, polyvinylpyrrolidone, polytetrafluoroethylene (PTFE), polyvinylidene fluoride (PVdF), polyethylene or polypropylene may be used. Also, any one selected from the group consisting of acrylonitrile-butadiene rubber, styrene-butadiene rubber, and acrylic rubber, which are aqueous binders, or a mixture of two or more thereof may be used. An aqueous binder is economical and eco-friendly when compared with a non-aqueous binder, and also harmless to the health of an operator. Since an aqueous binder has excellent binding effect when compared with a non-aqueous binder, the ratio of the active material per unit volume may be increased, thereby enabling high capacity. Preferably, styrene-butadiene rubber may be used as an aqueous binder.

The binder may be included in an amount of 10 wt % or less based on the total weight of the slurry for a negative electrode active material, specifically in an amount of 0.1 wt % to 10 wt %. If the content of the binder is less than 0.1 wt %, the effect of using the binder is insignificant, and if greater than 10 wt %, it is not preferable since there is a concern that the capacity per volume may be deteriorated due to a relative decreased in the content of the active material with an increase in the content of the binder.

The conductive agent is not particularly limited as long as it has conductivity without causing a chemical change in the battery. Examples of the conductive agent may comprise graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used. The conductive agent may be used in an amount of 1 wt % to 9 wt % based on the total weight of the slurry for a negative electrode active material.

A negative electrode current collector used in the negative electrode according to an embodiment of the present invention may have a thickness of 3 µm to 500 µm. The negative electrode current collector is not particularly limited as long as it has conductivity without causing a chemical change in the battery. For example, copper, gold, stainless steel, aluminum, nickel, titanium, fired carbon, copper or stainless steel that is surface-treated with one of carbon, nickel, titanium, silver, and the like, and an aluminum-cadmium alloy may be used. Also, microscopic irregularities may be formed on the surface of the negative electrode current collector to improve the adhesion of a negative electrode active material, and the negative electrode current collector may be used in various forms of such as a film, a sheet, a foil, a net, a porous body, a foam body, and a non-woven fabric body.

Also, as a separator, a typical porous polymer film used as a separator, for example, a porous polymer film prepared with a polyolefin-based polymer, such as an ethylene homopolymer, a propylene homopolymer, an ethylene/butene copolymer, an ethylene/hexene copolymer, and an ethylene/methacrylate copolymer may be used alone, or a laminated structure thereof may be used. Alternately, a typical porous non-woven fabric, for example, a non-woven fabric formed of high melting point glass fibers or polyethylene terephthalate fibers may be used, but the embodiment of the present invention is not limited thereto.

A lithium salt which may be included as an electrolyte used in the present invention may be used without limitation as long as it is typically used as an electrolyte for a lithium secondary battery. For example, as negative electrode ion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

An organic solvent included in the electrolyte used in the present invention may be used without limitation as long as it is typically used in an electrolyte for a secondary battery. Representative examples thereof may be any one selected from the group consisting of propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxyethane, diethoxyethane vinylene carbonate, sulfolane, gamma-butyrolactone, propylene sulfite, and tetrahydrofuran, or a mixture of two or more thereof. Specifically, among the carbonate-based organic solvents, ethylene carbonate and propylene carbonate, which are cyclic carbonates, are organic solvents of high viscosity and have high dielectric constant so as to dissociate a lithium salt in an electrolyte well, and thus may be preferably used. When such a cyclic carbonate is mixed with a low viscosity, low dielectric constant linear carbonate such as dimethyl carbonate and diethyl carbonate in an appropriate ratio, an electrolyte having a high electrical conductivity may be prepared, and thus may be more preferably used.

Optionally, the electrolyte stored in accordance with the present invention may further comprise an additive such as overcharge protection agent contained in a typical electrolyte.

The external shape of the lithium secondary battery is not particularly limited, but may be a cylindrical shape using a can, a square shape, a pouch shape, a coin shape, and the like.

The lithium secondary battery may be used in a battery cell used as a power source of a small device, and may be a unit cell of a battery module comprising a plurality of battery cells or a unit cell of a medium- and large-sized battery module used in a medium- and large-sized device.

Preferable examples of the above medium- and large-sized devices comprise electric vehicles, hybrid electric vehicles, plug-in hybrid electric vehicles, and electric power storage systems, but are not limited thereto.

MODE FOR CARRYING OUT THE INVENTION

Examples

Hereinafter, the present invention will be described in more detail with reference to Examples and Experimental Examples. However, the present invention is not limited by these Examples and Experimental Examples. The embodiments according to the present invention can be modified into various different forms, and the scope of the present invention should not be construed as being limited to the embodiments described below. The embodiments of the present invention are provided to more fully describe the present invention to those skilled in the art.

Example 1

<Manufacturing of Positive Electrodes 1 to 14>

98.38 wt % of $Li(Ni_{0.6}Co_{0.2}Mn_{0.2})O_2$ having a particle diameter of 10 μm as a positive electrode active material, 0.35 wt % of carbon nanotube (CNT) as a conductive agent, 1.2 wt % of polyvinylidene fluoride (PVdF) as a binder, a dispersant in which 0.07 wt % of polyvinylidene fluoride (PVdF) is mixed in N-methyl-2-pyrrolidone (NMP) as a solvent, and N-methyl-2-pyrrolidone (NMP) as solvent was used.

A positive electrode slurry was prepared in 14 different manners as shown in Table 1 below. Specifically, in the case of positive electrodes 1 to 7, a dispersant and a conductive agent were mixed, and then a binder and a positive electrode active material were added thereto and mixed for one time to prepare a positive electrode slurry. In the case of positive electrodes 8 to 14, a dispersant and a conductive agent were mixed, and then a binder was added thereto. Thereafter, a positive electrode active material was mixed thereto to prepare a positive electrode slurry.

Each of the 14 positive electrode mixture slurries was applied to an aluminum (Al) thin film having a thickness of about 20 μm, which is a positive electrode current collector, dried and then roll pressed to manufacture a positive electrode.

TABLE 1

| Type | Manufacturing process |
|---|---|
| Positive electrode 1 | Mix a dispersant and a conductive agent. |
| Positive electrode 2 | Mix a dispersant and a conductive agent and then mix for one time for 30 minutes at 45 rpm using a stirrer. |
| Positive electrode 3 | Mix a dispersant and a conductive agent and then mix for one time for 30 minutes at 60 rpm using a stirrer. |
| Positive electrode 4 | Mix a dispersant and a conductive agent and then mix for one time for 30 minutes at 80 rpm using a stirrer. |
| Positive electrode 5 | Mix a dispersant and a conductive agent and then mix one time for 30 minutes at 45 rpm using a stirrer. |
| Positive electrode 6 | Mix a dispersant and a conductive agent and then mix for two times for 30 minutes at 60 rpm using a stirrer. |
| Positive electrode 7 | Mix a dispersant and a conductive agent and then mix for two times for 30 minutes at 80 rpm using a stirrer. |
| Positive electrode 8 | Mix a dispersant and a conductive agent, and then mix a binder solution in which a binder is dispersed in a solvent with a mixed solution of the dispersant and the conductive agent. |
| Positive electrode 9 | Mix a dispersant and a conductive agent, and then first mix a binder solution in which a binder is dispersed in a solvent with a mixed solution of the dispersant and the conductive agent to a ratio of 8:2, mix the remaining binder solution, and mix for one time. |
| Positive electrode 10 | Mix a dispersant and a conductive agent, and then first mix a binder solution in which a binder is dispersed in a solvent with a mixed solution of the dispersant and the conductive agent to a ratio of 8:2, and mix the remaining binder solution, and mix for two times. |

TABLE 1-continued

| Type | Manufacturing process |
|---|---|
| Positive electrode 11 | Mix a dispersant and a conductive agent, and then first mix a binder solution in which a binder is dispersed in a solvent with a mixed solution of the dispersant and the conductive agent to a ratio of 7:3, mix the remaining binder solution, and mix for one time. |
| Positive electrode 12 | Mix a dispersant and a conductive agent, and then first mix a binder solution in which a binder is dispersed in a solvent with a mixed solution of the dispersant and the conductive agent to a ratio of 7:3, and mix the remaining binder solution, and mix for two times. |
| Positive electrode 13 | Mix a dispersant and a conductive agent, and then first mix a binder solution in which a binder is dispersed in a solvent with a mixed solution of the dispersant and the conductive agent to a ratio of 6:4, mix the remaining binder solution, and mix for one time. |
| Positive electrode 14 | Mix a dispersant and a conductive agent, and then first mix a binder solution in which a binder is dispersed in a solvent with a mixed solution of the dispersant and the conductive agent to a ratio of 6:4, and mix the remaining binder solution, and mix for two times. |

To each of the 14 positive electrodes manufactured as above, according to the present invention, an alternating current was applied while changing a frequency from $10^5$ Hz to $10^9$ Hz using a broadband dielectric spectrometer to identify a specific frequency (Fc) at a point at which the conductivity of each of the electrodes changes from a DC conductivity to an AC conductivity.

<Manufacturing of Negative Electrode>

96 wt % of natural graphite as a negative electrode active material, 1 wt % of Denka black (conductive agent), 2 wt % of SRB (binder), and 1 wt % of CMC (thickener) was added to water to prepare a negative electrode mixture slurry.

Then, the negative electrode mixture slurry was coated on one surface of a copper current collector, dried, rolled and then punched to a predetermined size to manufacture a negative electrode.

<Manufacturing of Lithium Secondary Battery>

After the specific frequency (Fc) is identified, a porous polyethylene separator having a thickness of 17 μm was interposed between each of the 14 positive electrodes and the negative electrode manufactured above. Thereafter, an electrolyte in which 1M of $LiPF_6$ is dissolved was added to a solvent in which ethylene carbonate (EC) and diethyl carbonate (DEC) are mixed in a volume ratio of 30:70 to manufacture a pouch-type secondary battery, respectively.

The mass transfer resistance of each of the secondary batteries manufactured above was measured, and the results are shown in FIG. 1.

Referring to FIG. 1, a half-cell manufactured respectively using the above 14 positive electrodes has the same positive electrode composition. However, the specific frequency (Fc) at a point at which the conductivity of the electrode changes from a DC conductivity to an AC conductivity and the material resistance value at this time were different from each other. It was determined that this is due to the difference in the conditions of the manufacturing process of each electrode. It was confirmed that the frequency at which the mass transfer resistance value of the 14 positive electrodes starts to represent a minimum value is near $10^7$ Hz.

Example 2

<Manufacturing of Positive Electrodes i to iv>

96.25 wt % of $Li(Ni_{0.6}Co_{0.2}Mn_{0.2})O_2$ having a particle diameter of 10 μm as a positive electrode active material, 1.5 wt % of carbon black as a conductive agent, 2.025 wt % of polyvinylidene fluoride (PVdF) as a binder, a dispersant in which 0.225 wt % of polyvinylidene fluoride (PVdF) is mixed in N-methyl-2-pyrrolidone (NMP) as a solvent, and N-methyl-2-pyrrolidone (NMP) as solvent was used.

A positive electrode slurry was prepared in 4 different manners as shown in Table 2 below. Each of the 4 positive electrode mixture slurries was applied to an aluminum (Al) thin film having a thickness of about 20 μm, which is a positive electrode current collector, dried and then roll pressed to manufacture a positive electrode.

TABLE 2

| Type | Manufacturing process |
|---|---|
| Positive electrode i | A conductive agent, a binder, and a positive electrode active material were added together and mixed in a solvent, and no dispersant was used (solid content: 60%). |
| Positive electrode ii | A conductive agent, a binder, and a positive electrode active material were added together and mixed in a solvent, and no dispersant was used (solid content: 65%). |
| Positive electrode iii | A dispersant and a conductive agent were mixed for one time, added with a binder, and then added with a positive electrode active material to prepare a positive electrode slurry. |
| Positive electrode iv | A dispersant and a conductive agent were mixed for two times, added with a binder, and then added with a positive electrode active material to prepare a positive electrode slurry. |

To each of the 4 positive electrodes manufactured as above, according to the present invention, an alternating current was applied while changing a frequency from $10^5$ Hz to $10^9$ Hz using a broadband dielectric spectrometer to identify a specific frequency (Fc) at a point at which the conductivity of each of the electrodes changes from a DC conductivity to an AC conductivity.

After the specific frequency (Fc) is identified, a porous polyethylene separator having a thickness of 17 μm was interposed between each of the 4 positive electrodes and the negative electrode manufactured in Example 1. Thereafter, an electrolyte in which 1M of LiPF6 is dissolved was added to a solvent in which ethylene carbonate (EC) and diethyl carbonate (DEC) are mixed in a volume ratio of 30:70 to manufacture a pouch-type secondary battery, respectively.

Figure 2:
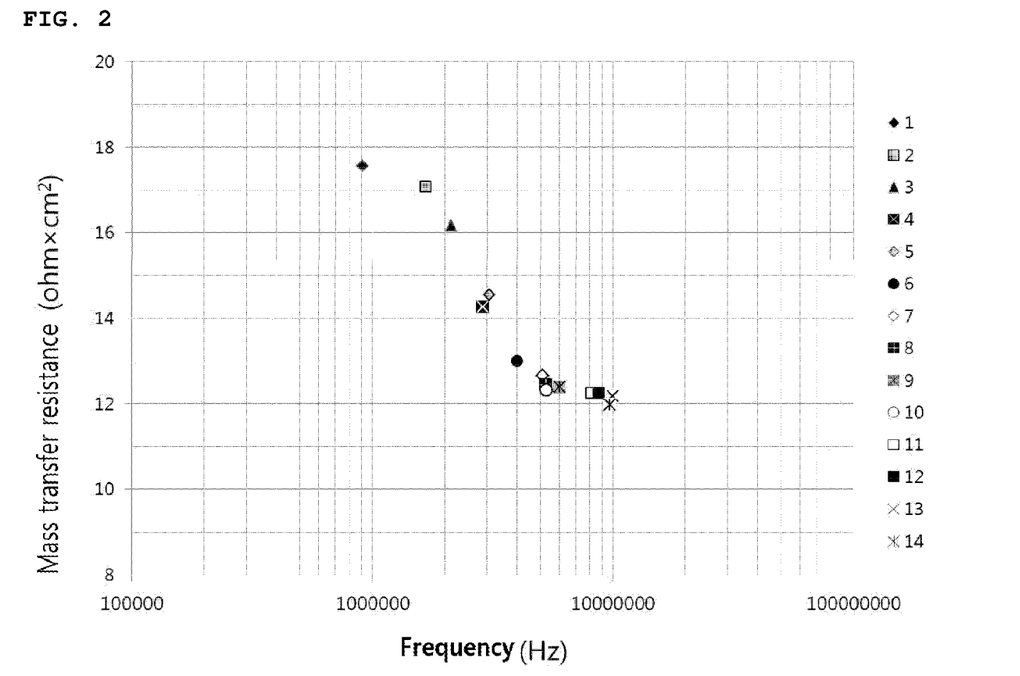
FIG. 2 is a view showing the result of measuring the mass transfer resistance at a specific frequency of the positive electrodes manufactured in Example 1.
Figure 3:
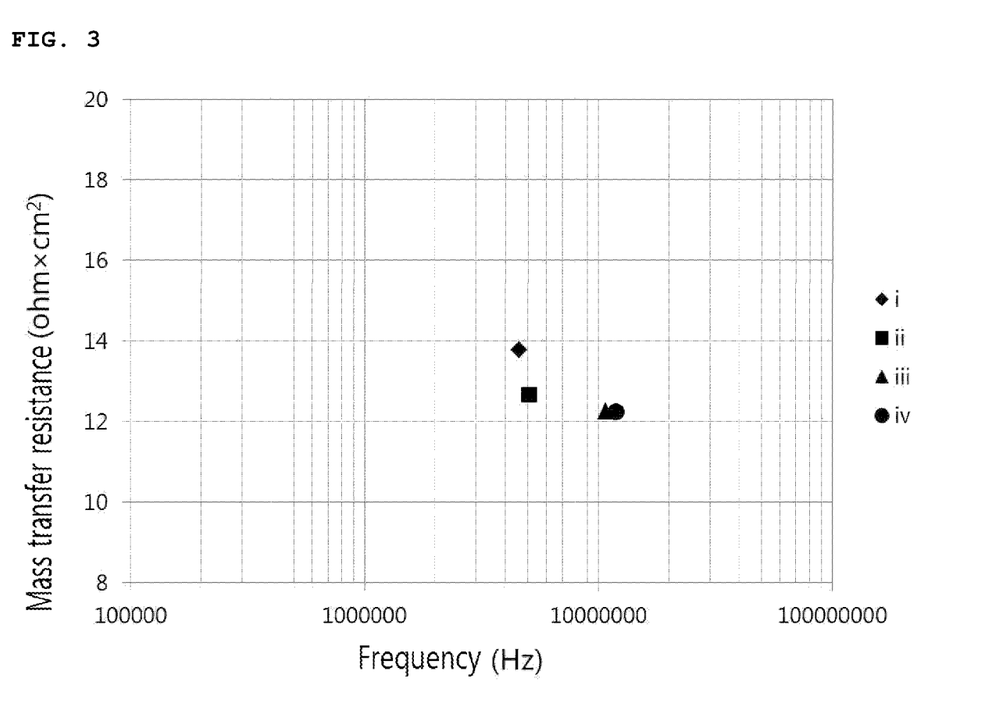
FIG. 3 is a view showing the result of measuring the mass transfer resistance at a specific frequency of the positive electrodes manufactured in Example 2.

The material transfer resistance of each of the secondary batteries manufactured above was measured, and the results are shown in FIG. 2.

Referring to FIG. 2, the half-cells manufactured respectively using the above 4 positive electrodes has the same positive electrode composition. However, the specific frequency (Fc) at a point at which the conductivity of the electrode changes from a DC conductivity to an AC conductivity and the material resistance value at this time were different from each other. It was determined that this is due to the difference in the mixing conditions of the manufacturing process of each electrode. It was confirmed that the frequency starting to represent the minimum value of the mass transfer resistance value of the half cells manufactured respectively using the four positive electrodes is near $10^7$ Hz as in Example 1.

Through the results of Examples 1 and 2 shown in FIGS. 1 and 2, it was confirmed that when various conditions of a manufacturing process of a positive electrode are changed which can affect the formation of an electrical pathway inside the positive electrode, the specific frequency (Fc) at a point at which the conductivity of the electrode measured using a broadband dielectric spectrometer changes from the DC conductivity to the AC conductivity represents a different value, respectively. In addition, the mass transfer resistance was also confirmed to represent a different value. However, the mass transfer resistance of the positive electrodes manufactured in Example 1 and the positive electrodes manufactured in Example 2 were not further decreased after having reaching a certain point, respectively. When various conditions of a manufacturing process of a positive electrode were changed, it was confirmed that a specific frequency (Fc) of the positive electrode was near the $10^7$ Hz.

Example 3

<Manufacturing of Positive Electrode a>

97.1 wt % of $Li(Ni_{0.6}Co_{0.2}Mn_{0.2})O_2$ having a particle diameter of 5 μm as a positive electrode active material, 1 wt % of carbon black as a conductive agent, 1.8 wt % of polyvinylidene fluoride (PVdF) as a binder, and a dispersant in which 0.225 wt % of polyvinylidene fluoride (PVdF) is mixed in N-methyl-2-pyrrolidone (NMP) as a solvent were added to N-methyl-2-pyrrolidone (NMP) as solvent. The positive electrode slurry was applied to an aluminum (Al) thin film having a thickness of about 20 μm, which is a positive electrode current collector, dried and then roll pressed to manufacture a positive electrode.

<Manufacturing of Positive Electrodes b to d>

A positive electrode was manufactured in the same manner as in the manufacturing of Positive electrode a except that the weight of the positive active material was changed to 96.6 wt %, 96.1 wt %, and 95.1 wt %, respectively, and the content of the conductive agent was changed to 1.5 wt %, 2 wt %, and 3 wt %, respectively.

To each of the 4 positive electrodes manufactured as above, according to the present invention, an alternating current was applied while changing a frequency from $10^5$ Hz to $10^9$ Hz using a broadband dielectric spectrometer to identify a specific frequency (Fc) at a point at which the conductivity of each of the electrodes changes from a DC conductivity to an AC conductivity.

After the specific frequency (Fc) is identified, a porous polyethylene separator having a thickness of 17 μm was interposed between each of the 4 positive electrodes and the negative electrode manufactured in Example 1. Thereafter, an electrolyte in which 1M of $LiPF_6$ is dissolved was added to a solvent in which ethylene carbonate (EC) and diethyl carbonate (DEC) are mixed in a volume ratio of 30:70 to manufacture a pouch-type secondary battery, respectively.

Figure 4:
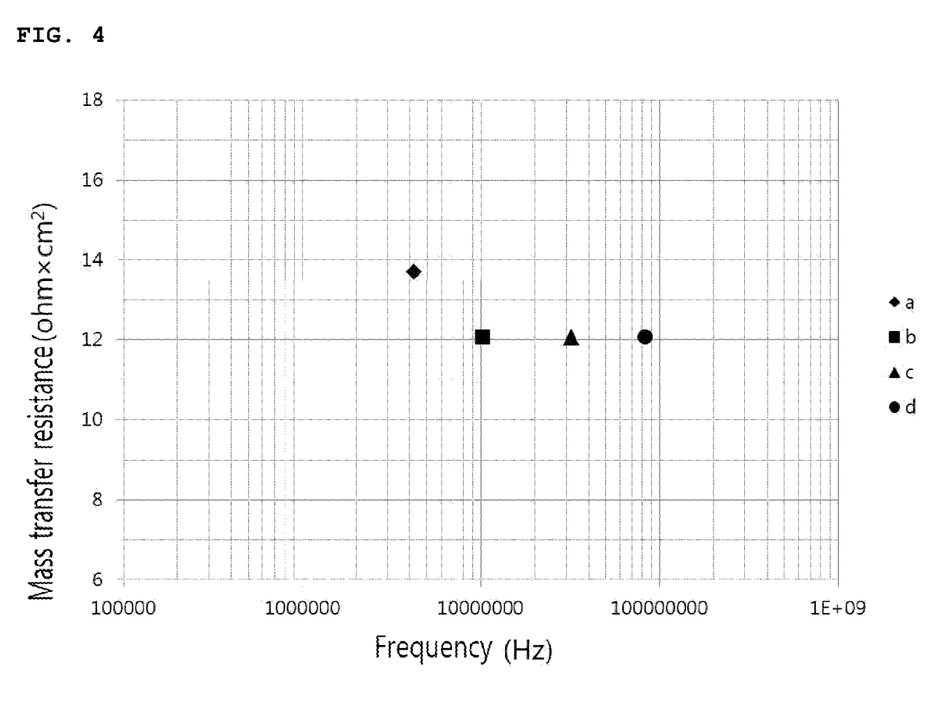
FIG. 4 is a view showing the result of measuring the mass transfer resistance at a specific frequency of the positive electrodes manufactured in Example 3.

The material transfer resistance of each of the secondary batteries manufactured above was measured, and the results are shown in FIG. 4.

The four positive electrodes were manufactured by varying the content of a conductive agent thereof while using a positive electrode active material having a small particle size. Referring to FIG. 4, as the content of the conductive agent was increased, it was confirmed that the frequency at a point (specific frequency) at which the conductivity of the four electrodes changed from the DC conductivity to the AC conductivity was increased. However, the value of mass transfer resistance of each battery comprising the positive electrode was not further decreased after having reaching a certain level, and the specific frequency (Fc) of the positive electrode (Positive electrode b) included in the battery at a point at which the value of mass transfer resistance is no longer decreased was near $10^7$ Hz. In the case of Positive electrode c and Positive electrode d which contain more conductive agent, a specific frequency (Fc) value was exhibited at a point exceeding $10^7$ Hz as the content of the conductive agent increased. However, the value of mass transfer resistance of each battery comprising the positive electrodes was the same as that of a battery comprising Positive electrode B. As a result, it was confirmed that the content of a conductive agent above a certain level did not affect the mass transfer resistance of a positive electrode. In addition, it was confirmed that when the value of mass transfer resistance of a battery starts to exhibit a minimum value, a positive electrode included in the battery at this time has an optimum content of a conductive agent. At this time, it was confirmed that the frequency starting to represent the minimum value of the mass transfer resistance value of the half cells manufactured respectively using the four positive electrodes is near $10^7$ Hz as in Example 1.

Example 4

<Manufacturing of Positive Electrode A>

99.3 wt % of $Li(Ni_{0.6}Co_{0.2}Mn_{0.2})O_2$ having a particle diameter of 12 μm as a positive electrode active material, 0.4 wt % of carbon black as a conductive agent, 0.17 wt % of polyvinylidene fluoride (PVdF) as a binder, and a dispersant in which 0.1 wt % of polyvinylidene fluoride (PVdF) is mixed in N-methyl-2-pyrrolidone (NMP) as a solvent were added to N-methyl-2-pyrrolidone (NMP) as solvent. The positive electrode slurry was applied to an aluminum (Al) thin film having a thickness of about 20 μm, which is a positive electrode current collector, dried and then roll pressed to manufacture a positive electrode.

<Manufacturing of Positive Electrodes B to D>

A positive electrode was manufactured in the same manner as in the manufacturing of Positive electrode a except that the weight of the positive active material was changed to 99 wt %, 98.7 wt %, 97.3 wt %, and 96.3 wt %, respectively, and the content of the conductive agent was changed to 0.7 wt %, 1 wt %, 2 wt %, and 3 wt %, respectively.

To each of the 5 positive electrodes manufactured as above, according to the present invention, an alternating current was applied while changing a frequency from $10^5$ Hz to $10^9$ Hz using a broadband dielectric spectrometer to identify a specific frequency (Fc) at a point at which the conductivity of each of the electrodes changes from a DC conductivity to an AC conductivity.

After the specific frequency (Fc) is identified, a porous polyethylene separator having a thickness of 17 μm was interposed between each of the 5 positive electrodes and the negative electrode manufactured in Example 1. Thereafter, an electrolyte in which 1M of $LiPF_6$ is dissolved was added to a solvent in which ethylene carbonate (EC) and diethyl carbonate (DEC) are mixed in a volume ratio of 30:70 to manufacture a pouch-type secondary battery, respectively.

Figure 5:
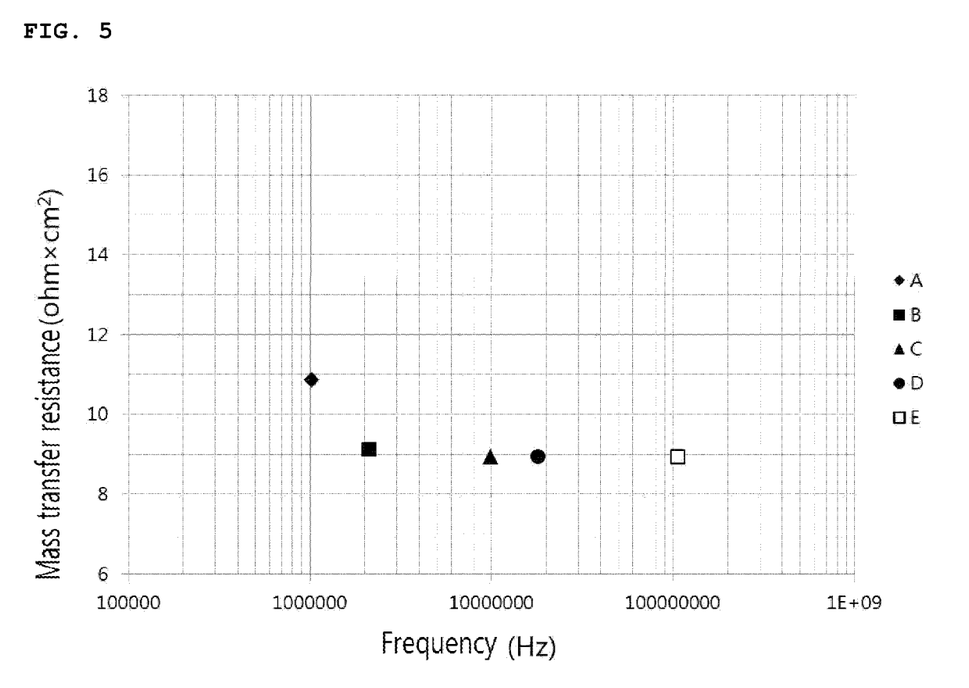
FIG. 5 is a view showing the result of measuring the mass transfer resistance at a specific frequency of the positive electrodes manufactured in Example 3.

The material transfer resistance of each of the secondary batteries manufactured above was measured, and the results are shown in FIG. 5.

The five positive electrodes were manufactured by varying the content of a conductive agent thereof while using a positive electrode active material having a large particle size. Referring to FIG. 5, as the content of the conductive agent was increased, it was confirmed that the frequency at a point (specific frequency) at which the conductivity of the five positive electrodes changed from the DC conductivity to the AC conductivity was increased as in Example 3. However, the value of mass transfer resistance of each battery comprising the positive electrode was not further decreased after having reaching a certain level as well, and the specific frequency (Fc) of the positive electrode (Positive electrode C) included in the battery at a point at which the value of mass transfer resistance is no longer decreased was near $10^7$ Hz. In the case of Positive electrode D and Positive electrode E which contain more conductive agent, a specific frequency (Fc) value was exhibited at a point exceeding $10^7$ Hz as the content of the conductive agent increased. However, the value of mass transfer resistance of each battery comprising the positive electrodes was the same as that of a battery comprising Positive electrode C. Meanwhile, the value of mass transfer resistance of the five batteries manufactured in Example 4 was smaller than that of the four batteries manufactured in Example 3.

Through the experiments of Examples 3 and 4, it was confirmed that even if the formation of an electrical connection channel in a positive electrode is increased, the mass transfer resistance of the positive electrode is not further decreased below a certain level. That is, it was confirmed that even though a specific frequency at which the conductivity of the positive electrode changes from a DC conductivity to an AC conductivity may be changed or increased according to the type and composition of materials included in the positive electrode, the mass transfer resistance of the electrode having a specific frequency exceeding a certain value is not reduced below a certain value.

The mass transfer resistance of the secondary battery, that is, the specific frequency (Fc) at a point at which the mass transfer resistance of the positive electrode starts not to be further decreased exhibited the same or similar values in Examples 1 to 4. Accordingly, the content of the conductive agent of the electrode having a specific frequency (Fc) of the above value becomes the content of the minimum conductive agent for allowing the positive electrode to have the mass transfer resistance, and when the specific frequency (Fc) at the time when the mass transfer resistance starts not to be further decreased is set as the reference frequency (Fr), only by identifying the specific frequency (Fc) of a positive electrode to be manufactured thereafter and comparing the same with the reference frequency (Fr), it is possible to determine whether the mass transfer resistance of the manufactured positive electrode may be further decreased or not.

Accordingly, in the designing of an electrode, it is possible to design and manufacture the electrode by preparing electrodes to be tested, measuring an AC current frequency (specific frequency) at which the conductivity of the electrode changes from a DC conductivity to an AC conductivity to determine whether an electrode whose frequency is near a reference frequency (Fr) as an electrode having an internal electrical path well-formed therein.

The invention claimed is:

1. A method for designing an electrode for a lithium secondary battery, the method comprising:
    (1) manufacturing a plurality of electrodes each containing an active material, a binder, and a conductive agent, and having a different content of the conductive agent from each other;
    (2) applying an alternating current to each of the plurality of electrodes manufactured above while changing a frequency and using a broadband dielectric spectrometer (BDS) to measure conductivity of each of the electrodes;
    (3) identifying a specific frequency (Fc) at a point at which the conductivity of each of the electrodes changes from a DC conductivity to an AC conductivity; and
    (4) comparing the specific frequency (Fc) and a preset reference frequency (Fr) of $10^7$ Hz to determine a deviation between the preset reference frequency (Fr) and the specific frequency (Fc), and determining a content of the conductive agent contained in an electrode is appropriate when the deviation is within a reference deviation of $3\times10^6$ Hz.

2. The method of claim 1, wherein the electrode in the step (1) comprises an additional conductive material other than the conductive agent, and the plurality of electrodes have a different content of the conductive agent and the conductive material.

3. The method of claim 1, wherein the measuring of the conductivity of the electrodes in the step (2) comprises observing a change in conductivity of the electrodes according to a change of the alternating current.

4. The method of claim 1 further comprising, when there are a plurality of electrodes corresponding to the case in which the deviation between the reference frequency (Fr) and the specific frequency (Fc) is within the reference deviation, determining a content of the conductive agent contained in an electrode having a lower specific frequency (Fc) to be an optimum value.

5. The method of claim 1, wherein the electrode for a lithium secondary battery is a positive electrode.

6. A method for manufacturing an electrode for a lithium secondary battery comprising determining the composition of an electrode according to claim 1.

* * * * *